United States Patent
Chou et al.

(10) Patent No.: US 10,965,877 B2
(45) Date of Patent: Mar. 30, 2021

(54) IMAGE GENERATING METHOD AND ELECTRONIC APPARATUS

(71) Applicant: Altek Semiconductor Corp., Hsinchu (TW)

(72) Inventors: Hong-Long Chou, Hsinchu (TW); Shih-Yuan Peng, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 75 days.

(21) Appl. No.: 16/421,452

(22) Filed: May 23, 2019

(65) Prior Publication Data

US 2020/0092452 A1    Mar. 19, 2020

(30) Foreign Application Priority Data

Sep. 19, 2018   (TW) .................... 107132878

(51) Int. Cl.
*H04N 5/232*  (2006.01)
*H04N 5/235*  (2006.01)
*H04N 5/217*  (2011.01)
*H04N 5/272*  (2006.01)

(52) U.S. Cl.
CPC ........... *H04N 5/2352* (2013.01); *H04N 5/217* (2013.01); *H04N 5/272* (2013.01)

(58) Field of Classification Search
CPC ....... H04N 5/2352; H04N 5/217; H04N 5/272
See application file for complete search history.

(56) References Cited

U.S. PATENT DOCUMENTS

| 8,310,553 B2 | 11/2012 | Matsunaga |
| 2005/0213849 A1 | 9/2005 | Kreang-Arekul et al. |
| 2007/0098291 A1 | 5/2007 | Niikura et al. |
| 2008/0187301 A1 | 8/2008 | Takahashi |
| 2010/0014780 A1 | 1/2010 | Kalayeh |
| 2010/0209009 A1* | 8/2010 | Matsunaga ............ H04N 9/045 382/224 |
| 2014/0003682 A1 | 1/2014 | Vieta et al. |

FOREIGN PATENT DOCUMENTS

| CN | 101424856 | 5/2009 |
| TW | 200930042 | 7/2009 |
| TW | I376945 | 11/2012 |
| TW | 201824177 | 7/2018 |
| TW | I633384 | 8/2018 |

* cited by examiner

*Primary Examiner* — Twyler L Haskins
*Assistant Examiner* — Fayez A Bhuiyan
(74) *Attorney, Agent, or Firm* — JCIPRNET

(57) ABSTRACT

An image generating method and an electronic apparatus are provided. The method includes: determining whether at least one object in a plurality of first images to be captured will generate a blur to generate a determination result; determining a first amount of at least one second image in the plurality of first images and a second amount of at least one third image in the plurality of first images according to the determination result, wherein a first setting for capturing the second image is different from a second setting for capturing the third image; capturing the second image according to the first setting; capturing the third image according to the second setting; using the first amount of the second image and the second amount of the third image to perform an image superposition operation to generate an output image; and outputting the output image.

14 Claims, 4 Drawing Sheets

IMAGE GENERATING METHOD AND ELECTRONIC APPARATUS

CROSS REFERENCE TO RELATED APPLICATION

This application claims the priority benefit of Taiwan application serial no. 107132878, filed on Sep. 19, 2018. The entirety of the above-mentioned patent application is hereby incorporated by reference herein and made a part of specification.

BACKGROUND

Technical Field

The disclosure relates to an image generating method and an electronic apparatus whereby a plurality of images are used to obtain an output image with better quality.

Description of Related Art

In the field of image processing, upon shooting a scene, a plurality of images of the scene may be taken consecutively, and then superposition may be performed on the plurality of images obtained from the shooting so as to generate an output image with better quality (e.g., with lesser noise). This operation in which a plurality of images are superposed to generate an output image with lesser noise is also referred to as a "multi-frame noise reduction" operation. However, in the conventional technique of the multi-frame noise reduction operation, the plurality of images for superposition are usually obtained using a single setting. For example, the light sensitivity (i.e., ISO values) used to shoot the images is the same, and the exposure time used to shoot the images is also the same.

However, in order to prevent the user's hand tremors from shaking the image, the light sensitivity is usually enhanced to reduce the exposure time in terms of shooting strategy. It should be noted that the image taken with the setting of higher light sensitivity and low exposure time usually has more noise. For the purpose of reducing the noise in the output image, it often takes more than four images to perform the image superposition operation. Nevertheless, if more than four images are superposed and motion compensation is simultaneously performed on more than four images, the calculation time would be too long. Besides, since the image obtained in the setting of higher light sensitivity has more noise, this feature also results in increased difficulty in detecting the edge area and the smooth area in the image.

In other words, when the image for superposition has too much noise, not only is it difficult to detect the edge area and the smooth area in the image, but it is also difficult to perform motion compensation. Accordingly, a greater number of images are often required to perform superposition effectively so as to generate an output image with lesser noise, and the time for calculation processing is therefore prolonged.

SUMMARY

The disclosure provides an image generating method and an electronic apparatus, in which a smaller number of images are used to perform superposition to generate an output image with better quality. Besides, when the same number of images as that in conventional methods are used for superposition, the method as recited in this disclosure may ensure that the quality of the output image is superior to the quality of the output image generated by the conventional methods.

An image generating method suitable for an electronic apparatus in one of exemplary embodiments of the disclosure is provided hereinafter. Whether at least one object in a plurality of first images to be captured generates a blur is determined so as to generate a determination result. A first amount of at least one second image in the plurality of first images and a second amount of at least one third image in the plurality of first images are determined according to the determination result, wherein a first setting for capturing the at least one second image is different from a second setting for capturing the at least one third image. The at least one second image is captured according to the first setting. The at least one third image is captured according to the second setting. The at least one second image with the first amount and the at least one third image with the second amount are used to perform an image superposition operation to generate an output image. The output image is outputted.

An electronic apparatus in one of exemplary embodiments of the disclosure is provided hereinafter. The electronic apparatus includes an image capturing device and a processor. The processor determines whether at least one object in a plurality of first images to be captured generates a blur so as to generate a determination result. The processor determines a first amount of at least one second image in the plurality of first images and a second amount of at least one third image in the plurality of first images according to the determination result, wherein a first setting for capturing the at least one second image is different from a second setting for capturing the at least one third image. The image capturing device captures the at least one second image according to the first setting. The image capturing device captures the at least one third image according to the second setting. The processor uses the at least one second image with the first amount and the at least one third image with the second amount to perform an image superposition operation to generate an output image. The processor outputs the output image.

Based on the foregoing, in the image generating method and the electronic apparatus of this disclosure, a smaller number of images may be used to perform superposition to generate an output image with better quality. Besides, when the same number of images as that in conventional methods is used for superposition, the method as recited in this disclosure may ensure that the quality of the output image is superior to the quality of the output image generated by the conventional methods.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
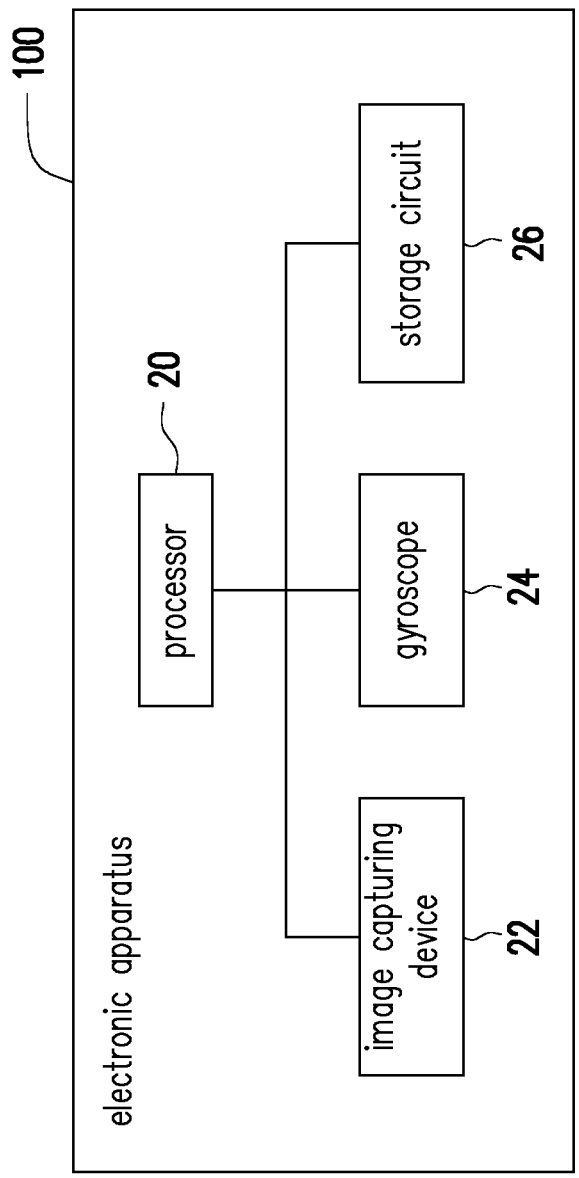
FIG. 1 is a schematic view showing an electronic apparatus according to an embodiment of the disclosure.

Descriptions of the disclosure are given with reference to the exemplary embodiments illustrated by the accompanying drawings hereinafter. In addition, wherever possible, identical or similar reference numerals stand for identical or similar elements/components in the drawings and embodiments.

FIG. 1 is a schematic view showing an electronic apparatus according to an embodiment of the disclosure.

Referring to FIG. 1, an electronic apparatus 100 includes a processor 20, an image capturing device 22, a gyroscope 24, and a storage circuit 26. The image capturing device 22, the gyroscope 24 and the storage circuit 26 are respectively coupled to the processor 20. The electronic apparatus 100 is, for example, an electronic device such as a mobile phone, a tablet computer or a notebook computer, but is not limited thereto.

The processor 20 may be a central processing unit (CPU), a programmable microprocessor for general use or special use, a digital signal processor (DSP), a programmable controller, an application specific integrated circuit (ASIC), other similar devices, or a combination of the foregoing.

The image capturing device 22 is used to capture one or more images. For example, the image capturing device 22 may be a built-in photograph lens or a photograph lens externally connected to the electronic apparatus 100, and may be equipped with a charge coupled device (CCD), a complementary metal-oxide semiconductor (CMOS) device, or other kinds of photosensitive devices. However, the disclosure is not limited thereto. In some embodiments, the electronic apparatus 100 is, for example, a notebook computer, and the image capturing device 22 is, for example, a camera embedded in the upper portion of the screen.

The gyroscope 24 is a device for sensing and maintaining direction, and may be designed based on the theory of angular momentum conservation. In this exemplary embodiment, the gyroscope 24 may be used to detect the shaking of the electronic apparatus 100.

The storage circuit 26 may be any type of stationary or movable random access memory (RAM), read-only memory (ROM), flash memory, similar components, or a combination of the foregoing.

In this exemplary embodiment, the storage circuit 26 of the electronic apparatus 100 stores a plurality of code snippets therein. The code snippets, after being installed, are executed by the processor 20. For example, the storage circuit 26 includes a plurality of modules, by which operations of the electronic apparatus 100 are executed respectively. Herein each module includes one or more code segments. However, the disclosure is not limited thereto. Each of the operations of the electronic apparatus 100 may also be implemented using other hardware forms.

In this exemplary embodiment, the image generating method of the disclosure may be mainly classified into a "shooting stage" and a "processing stage". The "shooting stage" and the "processing stage" are described in detail hereinafter.

[Shooting Stage]

In the image generating method of the disclosure, a plurality of images (also referred to as first images) are captured (i.e., shot), and an image superposition operation is performed using some or all of the images among the obtained first images. As a result, at the shooting stage, the processor 20 determines whether an object in the first images to be captured generates a blur to generate a determination result. Herein the blur of the object in the first images may be caused by the high moving speed of the object, or by hand tremors of the user holding the electronic apparatus 100.

In an embodiment of the disclosure, the processor 20 may obtain a plurality of images (also referred to as fourth images) that are sensed by the image capturing device 22 and are used for live view display. In other words, by means of the fourth images, the image sensed by the image capturing device 22 is instantly displayed on a display (not shown) of the electronic apparatus 100 for the user to view. The user may obtain the angle or range of the scene to be shot according to the aforementioned live view image.

After obtaining the fourth images, the processor 20 then calculates the difference between an image (also referred to as a fifth image) and another image (also referred to as a sixth image) in the fourth images. Herein a time interval exists between the time when the fifth image is obtained and the time when the sixth image is obtained. In other words, the fifth image and the sixth image may be two consecutive images respectively captured at a time interval. The method of calculating the difference between the two images may be known from conventional techniques, and details thereof are not repeated hereinafter.

When the difference between the fifth image and the sixth image is greater than a threshold value (also known as a first threshold value), the processor 20 then determines that the object in the first images to be captured generates a blur. In addition, when the difference between the fifth image and the sixth image is not greater than the first threshold value, the processor 20 then determines that the object in the first images to be captured does not generate a blur.

However, the disclosure does not impose any limitations on the method of determining whether an object in the first images to be captured generates a blur. In another embodiment, the gyroscope 24 may also be used to determine whether a blur is generated due to the hand tremors. More specifically, the processor 20 may obtain the value detected by the gyroscope 24. When the processor 20 determines that the shaking of the electronic apparatus 100 is greater than a threshold value (also referred to as a second threshold value) according to the value detected by the gyroscope 24, the processor 20 then determines that the object in the first images to be captured generates a blur. In addition, when the processor 20 determines that the shaking of the electronic apparatus 100 is not greater than the second threshold value according to the value detected by the gyroscope 24, the processor 20 then determines that the object in the first images to be captured does not generate a blur.

After determining whether the object in the first images to be captured generates a blur, the processor 20 may then generate a determination result. Afterwards, the processor 20 may determine an amount of a second image in the first images (also referred to as a first amount) and an amount of a third image in the first images (also referred to as a second amount) according to the determination result. In other words, the processor 20 determines the first amount of the second image and the second amount of the third image used for image superposition according to the determination result, and then further determines the total amount of the images to be shot according to the first amount and the second amount.

It should be noted that the setting for capturing the second image (also referred to as a first setting) is different from the setting for capturing the third image (also referred to as a second setting). In this exemplary embodiment, the exposure time length of the first setting is less than the exposure time length of the second setting, and the light sensitivity of the first setting is greater than the light sensitivity of the second setting. In other words, compared with the third image, the second image has more noise due to the greater light sensitivity of the first setting. However, since the exposure time length of the first setting is shorter, the blur at the edge of the object in the second image due to the movement of the object or the shaking of the electronic apparatus 100 is smaller. Compared with the second image, the third image has less noise due to the lesser light sensitivity of the second setting. However, since the exposure time length of the second setting is longer, the blur at the edge of the object in the third image due to the movement of the object or the shaking of the electronic apparatus 100 is greater. Due to the aforementioned characteristics, when the image superposition operation is performed later, it is possible to perform the superposition according to the characteristics respectively owned by the second image and the third image. Details of the image superposition process will be described later. In this exemplary embodiment, when the determination result shows that the object in the first images to be captured generates a blur, the first amount is greater than the second amount. The reason is as follows: since the blur generated at the edge in the second image is smaller, more second images may be used to prevent the blur of the object in an output image from being generated. In addition, when the determination result shows that the object in the first images to be captured does not generate a blur, the first amount is smaller than the second amount. The reason is as follows: since the first images to be captured do not tend to generate a blur, more third images may be used to perform the superposition operation so as to reduce the noise in the output image. The edge area in the image generated by the superposition operation also does not tend to generate a blur.

Afterwards, the image capturing device 22 captures the second image according to the first setting, and captures the third image according to the second setting. It should be noted that the image capturing device 22 may use the first setting to capture the second image with the first amount, and use the second setting to capture the third image with the second amount. However, the disclosure does not impose any limitations on the numbers of the images actually captured by the image capturing device 22. In other embodiments, the image capturing device 22 may also use the first setting to capture the second images in an amount greater than the first amount, and use the second setting to capture the third images in an amount greater than the second amount.

After the second image and the third image are captured and obtained, the "processing stage" may then be executed.

[Processing Stage]

At the processing stage, the processor 20 uses the second image with the first amount and the third image with the second amount to perform the image superposition operation to generate the output image.

More specifically, the processor 20 performs an edge detection operation on at least one of the second image and the third image to identify a smooth area (also referred to as a first smooth area) and an edge area (also referred to as a first edge area) in the second image. In addition, during the aforementioned edge detection operation, a smooth area (also referred to as a second smooth area) and an edge area (also referred to as a second edge area) in the third image are also identified. The processor 20 uses the first edge area and the second smooth area to perform the image superposition operation so as to generate the output image. The following should be noted here: since the blur at the edge of the object in the second image due to the movement of the object or the shaking of the electronic apparatus 100 is smaller, and since the blur at the edge of the object in the third image due to the movement of the object or the shaking of the electronic apparatus 100 is greater, the processor 20 selects the first edge area of the second image to perform the image superposition operation. In addition, since the smooth area of the second image has more noise and the smooth area of the third image has less noise, the processor 20 selects the second smooth area of the third image to perform the image superposition operation. In this way, the blur generated at the edge area in the output image may be reduced based on the characteristic of lesser blur in the edge area of the second image, and the quality of the smooth area in the output image may be improved based on the characteristic of lesser noise in the smooth area of the third image.

Figure 2:
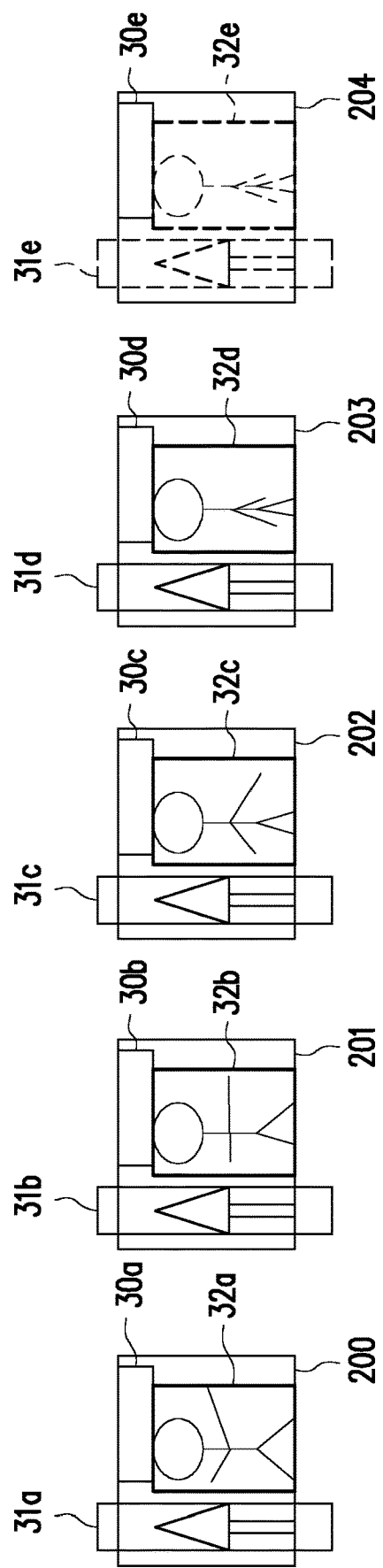
FIG. 2 is a schematic view showing the second image and the third image according to an embodiment of the disclosure.

For example, FIG. 2 is a schematic view showing the second image and the third image according to an embodiment of the disclosure.

Referring to FIG. 2, it is assumed that images 200-203 are the aforementioned second images shot by using the first setting, and an image 204 is the aforementioned third image shot by using the second setting. The processor 20 may perform an edge detection operation on at least one of the images 200-204 to identify smooth areas 30a-30e, smooth areas 31a-31e and edge areas 32a-32e in the images 200-204. During the process of image superposition, since the edge in the edge area 32e of the image 204 has a greater blur, the processor 20 avoids using the edge area 32e of the image 204 to perform superposition during the image superposition operation. In addition, since the noise in the smooth area 30e and the smooth area 31e of the image 204 is less than the noise in the smooth areas of other images, the processor 20 uses the smooth area 30e and the smooth area 31e of the image 204 to perform superposition during the image superposition operation. Therefore, during the image superposition operation, the processor 20 performs superposition by using at least one of the edge areas 32a-32d and by using the smooth area 30e and the smooth area 31e of the image 204 so as to generate an output image with better quality.

It should be noted that the processor 20 does not need to use all of the images 200-204 to perform image superposition so as to generate an output image. In other embodiments, the processor 20, for example, may use only some of the images 200-204 (for example, the images 202-204) to perform image superposition so as to generate an output image.

In addition, at the processing stage, the processor 20 further performs another edge detection operation on the output image to identify the edge area in the output image (also referred to as a third edge area). The processor 20 performs a noise removal operation on the third edge area in the output image. The reason lies in that the third edge area in the output image is generated by the first edge area of the second image. Since the noise in the first edge area of the second image is greater than that in the second smooth area, it is necessary to perform the noise removal operation on the third edge area in the output image. In addition, since the noise removal operation is only performed on the edge area in the output image instead of the entire output image, the processing time may be effectively reduced.

In particular, during the noise removal operation, a denoising intensity applied to a pixel is inversely proportional to the distance between the pixel and an edge in the third edge area. For example, FIG. 3 is a schematic view showing the noise removal operation according to an embodiment of the disclosure.

Figure 3:
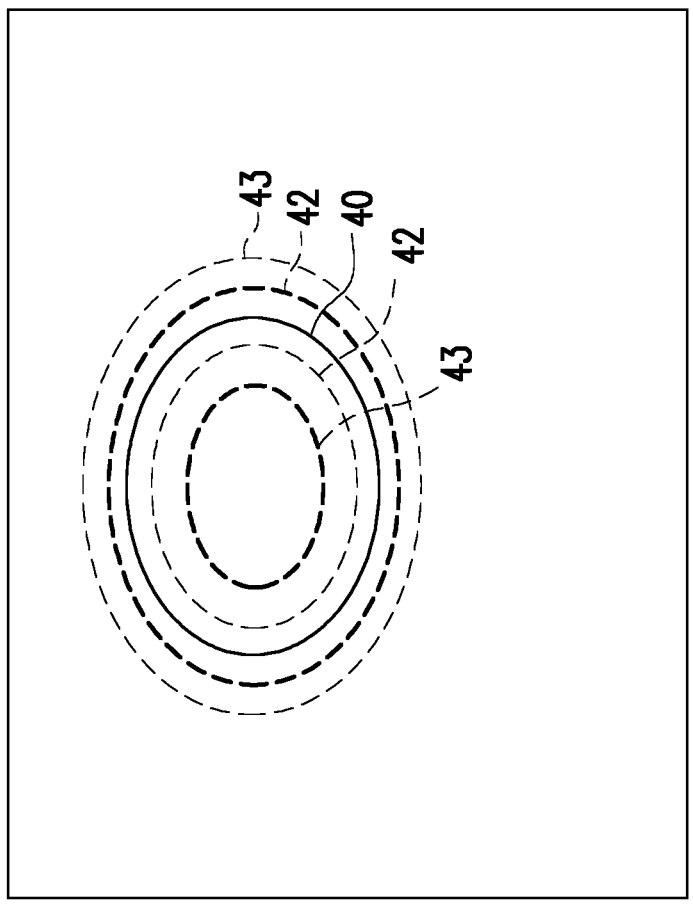
FIG. 3 is a schematic view showing the noise removal operation according to an embodiment of the disclosure.

Referring to FIG. 3, it is assumed that there is an edge 40 in FIG. 3. Since a pixel located on a dotted line 42 is closer to the edge 40 and a pixel located on a dotted line 43 is farther from the edge 40, the denoising intensity applied to the pixel on the dotted line 42 is greater than the denoising intensity applied to the pixel located on the dotted line 43.

After the noise removal operation on the output image is completed, the processor 20 then outputs the output image on which the noise removal operation has already been performed.

Figure 4:
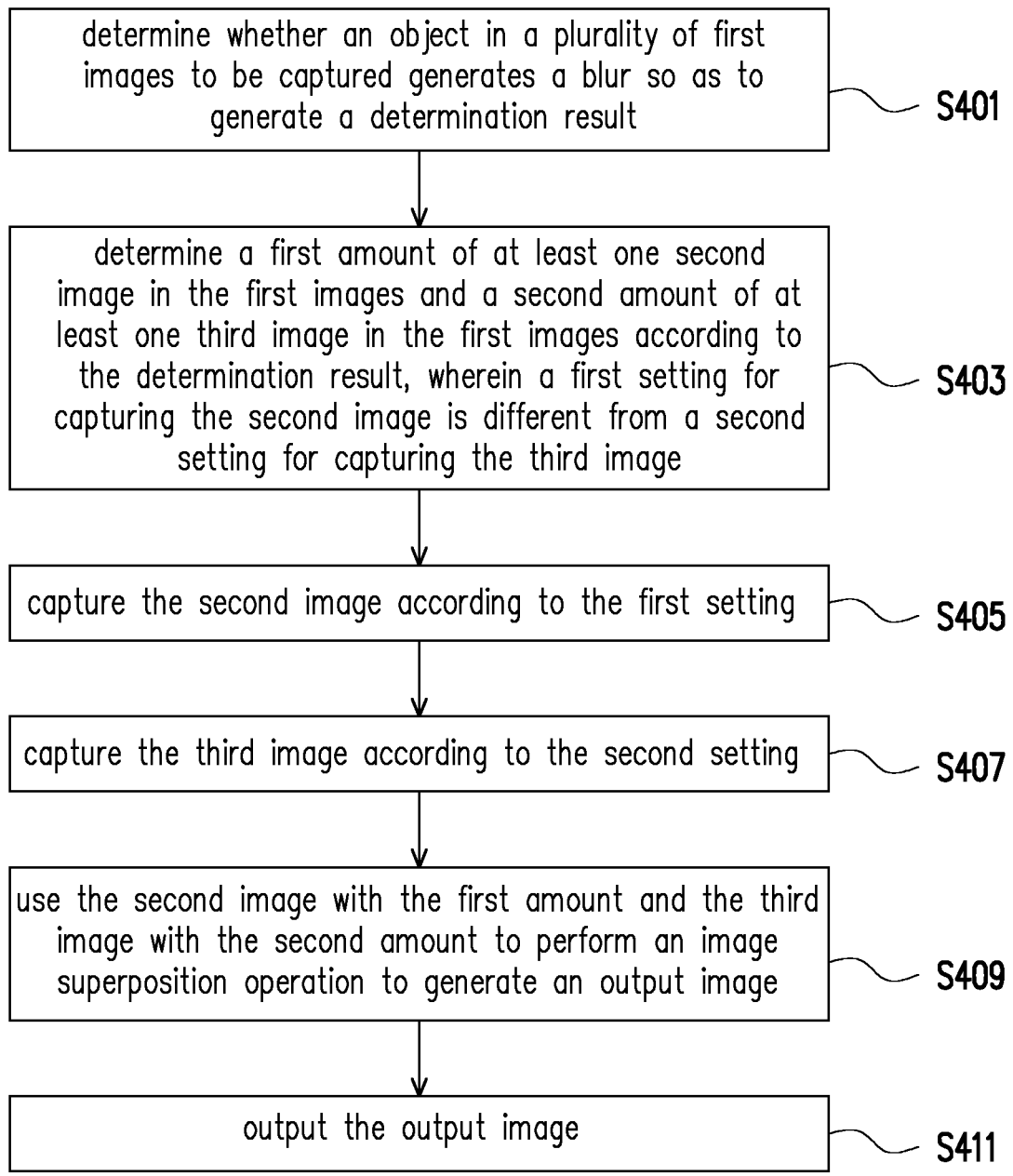
FIG. 4 is a flowchart showing the image generating method according to an embodiment of the disclosure.

FIG. 4 is a flowchart showing the image generating method according to an embodiment of the disclosure.

Referring to FIG. 4, in step S401, the processor 20 determines whether an object in a plurality of first images to be captured generates a blur so as to generate a determination result. In step S403, the processor 20 determines a first amount of at least one second image in the first images and a second amount of at least one third image in the first images according to the determination result, and herein a first setting for capturing the second image is different from a second setting for capturing the third image. In step S405, the image capturing device 22 captures the second image according to the first setting. In step S407, the image capturing device 22 captures the third image according to the second setting. In step S409, the processor 20 uses the second image with the first amount and the third image with the second amount to perform an image superposition operation to generate an output image. Lastly, in step S411, the processor 20 outputs the output image.

In summary, in the image generating method and the electronic apparatus of this disclosure, a smaller number of images may be used to perform superposition to generate an output image with better quality. Besides, when the same number of images as that in conventional methods is used for superposition, the method as recited in this disclosure may ensure that the quality of the output image is superior to the quality of the output image generated by the conventional methods.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image generating method suitable for an electronic apparatus, the image generating method comprising:
    determining whether at least one object in a plurality of first images to be captured generates a blur so as to generate a determination result;
    determining a first amount of at least one second image in the plurality of first images and a second amount of at least one third image in the plurality of first images according to the determination result, wherein a first setting for capturing the at least one second image is different from a second setting for capturing the at least one third image;
    capturing the at least one second image according to the first setting;
    capturing the at least one third image according to the second setting;
    using the at least one second image with the first amount and the at least one third image with the second amount to perform an image superposition operation to generate an output image; and
    outputting the output image,
    wherein using the at least one second image with the first amount and the at least one third image with the second amount to perform the image superposition operation comprises:
    performing an edge detection operation on at least one of the at least one second image and the at least one third image to identify a first smooth area and a first edge area in the at least one second image and a second smooth area and a second edge area in the at least one third image; and
    using the first edge area and the second smooth area to perform the image superposition operation so as to generate the output image.

2. The image generating method according to claim 1, wherein
    when the determination result shows that the at least one object in the plurality of first images to be captured generates a blur, the first amount is greater than the second amount, and
    when the determination result shows that the at least one object in the plurality of first images to be captured does not generate a blur, the first amount is smaller than the second amount.

3. The image generating method according to claim 1, wherein
    an exposure time length of the first setting is less than an exposure time length of the second setting, and
    a light sensitivity of the first setting is greater than a light sensitivity of the second setting.

4. The image generating method according to claim 1, further comprising:
    performing another edge detection operation on the output image to identify a third edge area in the output image;
    performing a noise removal operation on the third edge area in the output image; and
    outputting the output image on which the noise removal operation has already been performed.

5. The image generating method according to claim 4, wherein during the noise removal operation, a denoising intensity applied to at least one pixel is inversely proportional to a distance between the at least one pixel and an edge in the third edge area.

6. The image generating method according to claim 1, wherein determining whether the at least one object in the plurality of first images to be captured generates the blur so as to generate the determination result comprises:
    obtaining a plurality of fourth images that are used for live view display;
    calculating a difference between a fifth image and a sixth image in the plurality of fourth images, wherein a time interval exists between the time when the fifth image is obtained and the time when the sixth image is obtained;
    when the difference between the fifth image and the sixth image is greater than a first threshold value, determining that the at least one object in the plurality of first images to be captured generates the blur; and when the difference between the fifth image and the sixth image is not greater than the first threshold value, determining that the at least one object in the plurality of first images to be captured does not generate the blur.

7. The image generating method according to claim 1, wherein determining whether the at least one object in the plurality of first images to be captured generates the blur so as to generate the determination result comprises:

obtaining a value detected by a gyroscope of the electronic apparatus;

when it is determined that a shaking of the electronic apparatus is greater than a second threshold value according to the value detected by the gyroscope, determining that the at least one object in the plurality of first images to be captured generates the blur; and when it is determined that the shaking of the electronic apparatus is not greater than the second threshold value according to the value detected by the gyroscope, determining that the at least one object in the plurality of first images to be captured does not generate the blur.

8. An electronic apparatus, comprising:
an image capturing device; and
a processor, wherein
the processor determines whether at least one object in a plurality of first images to be captured generates a blur so as to generate a determination result,
the processor determines a first amount of at least one second image in the plurality of first images and a second amount of at least one third image in the plurality of first images according to the determination result, wherein a first setting for capturing the at least one second image is different from a second setting for capturing the at least one third image,
the image capturing device captures the at least one second image according to the first setting,
the image capturing device captures the at least one third image according to the second setting,
the processor uses the at least one second image with the first amount and the at least one third image with the second amount to perform an image superposition operation to generate an output image, and
the processor outputs the output image,
wherein when the first amount of the at least one second image and the second amount of the at least one third image are used to perform the image superposition operation,
the processor performs an edge detection operation on at least one of the at least one second image and the at least one third image to identify a first smooth area and a first edge area in the at least one second image and a second smooth area and a second edge area in the at least one third image, and
the processor uses the first edge area and the second smooth area to perform the image superposition operation so as to generate the output image.

9. The electronic apparatus according to claim 8, wherein when the determination result shows that the at least one object in the plurality of first images to be captured generates a blur, the first amount is greater than the second amount, and when the determination result shows that the at least one object in the plurality of first images to be captured does not generate a blur, the first amount is smaller than the second amount.

10. The electronic apparatus according to claim 8, wherein
an exposure time length of the first setting is less than an exposure time length of the second setting, and
a light sensitivity of the first setting is greater than a light sensitivity of the second setting.

11. The electronic apparatus according to claim 8, wherein
the processor performs another edge detection operation on the output image to identify a third edge area in the output image,
the processor performs a noise removal operation on the third edge area in the output image, and
the processor outputs the output image on which the noise removal operation has already been performed.

12. The electronic apparatus according to claim 11, wherein during the noise removal operation, a denoising intensity applied to at least one pixel is inversely proportional to a distance between the at least one pixel and an edge in the third edge area.

13. The electronic apparatus according to claim 8, wherein when it is determined whether the at least one object in the plurality of first images to be captured generates the blur so as to generate the determination result,
the processor obtains a plurality of fourth images that are used for live view display,
the processor calculates a difference between a fifth image and a sixth image in the plurality of fourth images, wherein a time interval exists between the time when the fifth image is obtained and the time when the sixth image is obtained,
when the difference between the fifth image and the sixth image is greater than a first threshold value, the processor determines that the at least one object in the plurality of first images to be captured generates the blur, and
when the difference between the fifth image and the sixth image is not greater than the first threshold value, the processor determines that the at least one object in the plurality of first images to be captured does not generate the blur.

14. The electronic apparatus according to claim 8, further comprising:
a gyroscope, wherein when it is determined whether the at least one object in the plurality of first images to be captured generates a blur so as to generate the determination result,
the processor obtains a value detected by the gyroscope,
when it is determined that a shaking of the electronic apparatus is greater than a second threshold value according to the value detected by the gyroscope, the processor determines that the at least one object in the plurality of first images to be captured generates the blur, and
when it is determined that the shaking of the electronic apparatus is not greater than the second threshold value according to the value detected by the gyroscope, the processor determines that the at least one object in the plurality of first images to be captured does not generate the blur.

* * * * *